(12) United States Patent
Nishijima et al.

(10) Patent No.: US 9,441,728 B2
(45) Date of Patent: Sep. 13, 2016

(54) SHIFT KNOB STRUCTURE

(71) Applicant: TOYOTA JIDOSHA KABUSHIKI KAISHA, Toyota-shi, Aichi-ken (JP)

(72) Inventors: Naoto Nishijima, Toyota (JP); Shori Kato, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/726,974

(22) Filed: Jun. 1, 2015

(65) Prior Publication Data

US 2015/0362064 A1 Dec. 17, 2015

(30) Foreign Application Priority Data

Jun. 11, 2014 (JP) .................. 2014-120770

(51) Int. Cl.
*G05G 1/06* (2006.01)
*G05G 1/12* (2006.01)
*F16H 59/02* (2006.01)

(52) U.S. Cl.
CPC ............ *F16H 59/0278* (2013.01); *G05G 1/06* (2013.01); *G05G 1/12* (2013.01); *Y10T 74/2014* (2015.01)

(58) Field of Classification Search
CPC ..... F16H 59/0278; F16H 59/04; G05G 1/06; G05G 1/12; Y10T 74/2014
See application file for complete search history.

(56) References Cited

U.S. PATENT DOCUMENTS

| 9,016,969 B2 * | 4/2015 | Yang ................... F16B 3/04 403/109.2 |
| 9,032,829 B2 * | 5/2015 | Ujimoto ................ F16H 59/10 74/473.23 |
| 2015/0355668 A1 * | 12/2015 | Bekaert .................... G05G 1/12 74/511 R |

FOREIGN PATENT DOCUMENTS

| DE | EP 1143321 A2 * | 10/2001 | ............... G05G 1/06 |
| DE | 10232801 A1 * | 2/2004 | ......... F16H 59/0278 |
| JP | 2007-022536 A | 2/2007 | |
| JP | 5092893 B2 * | 12/2012 | ......... F16H 59/0278 |

* cited by examiner

*Primary Examiner* — Adam D Rogers
(74) *Attorney, Agent, or Firm* — Oliff PLC

(57) ABSTRACT

A shift knob structure includes a shift knob body and a cover member. Movement of the shift knob body in a direction of shaft axis is restricted by a securing member supported by a support part of the shift knob body being locked by a locking groove in the shift shaft. When the cover member is rotated relative to the shaft knob body, the securing member is deformed radially outward and the securing member is unlocked from the locking groove in the shift shaft so that the shift knob body can be removed from the shift shaft.

4 Claims, 13 Drawing Sheets

FIG. 1A
FIG. 1B
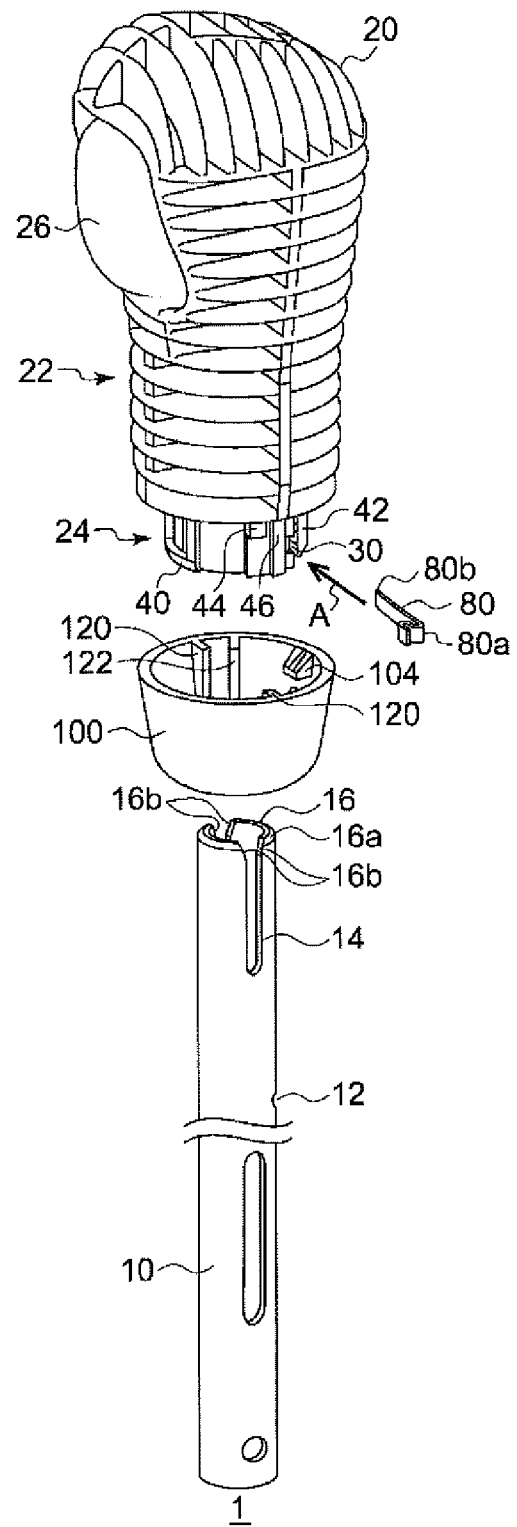
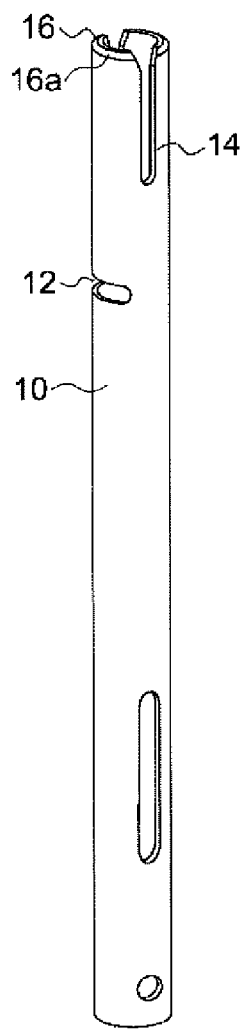

SHIFT KNOB STRUCTURE

BACKGROUND OF THE INVENTION

1. Field of the Invention

The present invention relates to a shift knob structure mounted to a shift shaft of a vehicle transmission.

2. Description of the Related Art

Various shift knob structures mounted on upper part of the shift shaft (shift lever) have been proposed in the past. Patent document 1 discloses a shift knob mounting structure in which a pair of left and right locking grooves are formed on the outer circumference of the shift lever, and a substantially Ω-shaped pin member is mounted to a pair of left and right pin fitting grooves provided in the lower cylindrical portion of the shift knob body. In the shift knob mounting structure disclosed in patent document 1, the top of the shift lever is inserted into the insertion hole of the shift knob body. When the pin member reaches the pair of locking grooves formed in the shift lever, a pair of curved locking portions of the pin member are set and locked in the locking grooves of the shift lever. A cover member is mounted to the lower cylindrical portion of the shift knob body from below. The interior side surface of the cover member comes into contact with the pin member from outside of the pin member and presses the pin member so as not to be expanded radially outward.

[patent document 1] JP2007-22536

The shift knob mounting structure disclosed in patent document 1 requires the job of pinching the pin member with fingers and removing the pin member from the pin fitting grooves in order to detach the shift knob body from the shift lever for maintenance, etc. Because the pin member is elastic, the job of removing the pin members from the pin fitting grooves needs to be carried out with discretion so as not to flip the pin member. As such, the related-art structure leaves much to be desired in terms of workability.

The pin member is pinched with fingers to detach the shift knob body from the shift lever. Therefore, a space to pinch the pin member needs to be created by moving the cover member downward and away from the lower cylindrical portion of the shift knob body by a distance sufficient to accommodate two fingers. This creates an additional problem in that the side surface of the shift lever between the position thereon aligned with the lower end of the cover occurring when the cover member is mounted on the shift knob body and the position occurring when the cover member is moved downward in order to remove the pin member is not suitable to form a design in consideration of the possibility that the cover member sliding along the side surface of the shift lever may damage the side surface.

SUMMARY OF THE INVENTION

The present invention addresses the issue and a purpose thereof is to provide a shift knob structure in which the shift knob body can be easily attached to and detached from the shift shaft, and, in particular, a shift knob structure in which the shift knob body can be easily removed from the shift shaft.

The shift knob structure according to an embodiment of the present invention that addresses the above issue includes a shift knob body and a cover member mounted to the bottom of the shift knob body. The shift knob body includes: an insertion hole in which a shaft is inserted; a support part that supports a securing member for clamping or fixing the shift knob body to the shaft inserted in the insertion hole; and a mount part for mounting the cover member. The cover member includes: an opening through which the shaft is inserted; and a locking part locked to the mount part. The support part supports the securing member so as to be deformable in a direction of shaft radius, movement of the shift knob body in a direction of shaft axis is restricted by the securing member being locked by a locking groove in the shaft, and the securing member is unlocked from the locking groove in the shaft by rotating the cover member relative to the shaft knob body so as to deform the securing member in the direction of shaft radius. A single locking groove may be provided.

According to this embodiment, there is provided a shift knob structure in which the securing member can be unlocked from the locking groove in the shaft by rotating the cover member relative to the shift knob body. The shift knob structure makes it unnecessary to remove the securing member from the shift knob body and makes it possible for the operator to remove the shift knob structure from the shaft by rotating the cover member relative to the shift knob body, with the securing member remaining mounted to the shift knob body. Therefore, workability will be improved.

The locking part may include first and second locking parts capable of being locked to the mount part. In a first state in which the first locking part is locked to the mount part, relative rotation of the cover member and the shift knob body is restricted, and in a second state in which the second locking part is locked to the mount part, relative rotation of the cover member and the shift knob body is enabled. By ensuring that the locking parts and the mount part can be locked in at least two states, the cover member and the shift knob body can be placed in at least one of a state in which relative rotation is disabled and a state in which relative rotation is enabled.

The cover member may include a rotation stopper wall portion, and the shift knob body may include a groove. In the first state, relative rotation of the cover member and the shift knob body is restricted by the rotation stopper wall portion entering the groove, and in the second state, relative rotation of the cover member and the shift knob body is enabled by the rotation stopper wall portion leaving the groove.

The first locking part may be a lower projection formed on an interior surface of the cover member and at a lower side of the cover member, the second locking part may be an upper projection formed on the interior surface of the cover member and at an upper side of the cover member, and an end of the upper projection may jut more radially inward than an end of the lower projection. By causing the end of the upper projection to jut more radially inward than the end of the lower projection, a larger load is necessary to unlock the mount part of the shift knob body from the upper projection than to unlock the mount part from the lower projection. Therefore, the mount part and the upper projection are locked after the mount part is unlocked from the lower projection so that the locked state is maintained.

The cover member may further include a bending wall portion that comes into contact with an end of the securing member and deforms the securing member, when the cover member and the shift knob body are rotated relative to each other.

Another embodiment of the present invention also relates to a shift knob structure including a shift knob body and a cover member mounted to the bottom of the shift knob body. The shift knob body includes: an insertion hole in which a shaft is inserted; a rotation stopper member formed in the insertion hole; a support part that supports a securing member for clamping or fixing the shift knob body to the shaft inserted in the insertion hole; and a mount part for mounting the cover member. The cover member includes: an opening through which the shaft is inserted; and a locking part locked to the mount part. The support part supports the securing member so as to be deformable in a direction of shaft radius, movement of the shift knob body in a direction of shaft axis is restricted by the securing member being locked by a single locking groove in the shaft, and relative rotation of the shift knob body and the shaft is restricted by the rotation stopper member being inserted into a pair of notch grooves in the shaft.

According to this embodiment, there is provided a shift knob structure capable of restricting movement of the shift knob body in the direction of shaft axis, by using a simple structure in which the securing member deformable in the direction of shaft radius is locked by the single locking groove in the shaft. According to the shift knob structure, relative rotation of the shift knob body and the shaft is restricted by the rotation stopper member formed in the insertion hole being inserted into the pair of notch grooves in the shaft. Therefore, the shift knob structure which can be easily attached to the shaft is realized.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 1A-1C show the shift knob structure according to the embodiment;

DETAILED DESCRIPTION OF THE INVENTION

Figure 1C:
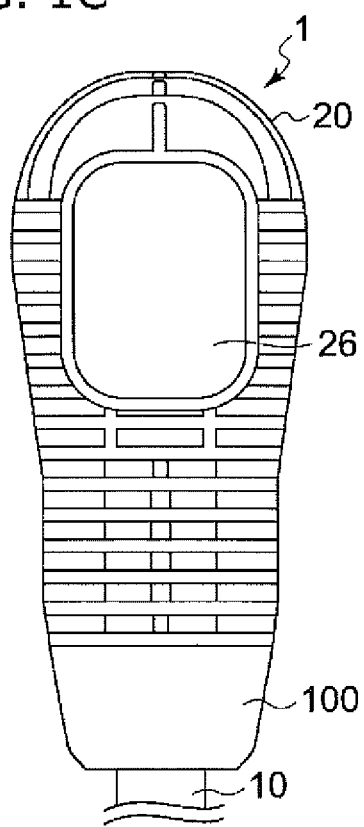

The invention will now be described by reference to the preferred embodiments. This does not intend to limit the scope of the present invention, but to exemplify the invention.

FIG. 1A is an exploded perspective view showing the shift knob structure according to an embodiment of the present invention. A shift knob structure 1 according to the embodiment is provided with a shift knob body 20 manipulated by a driver, and a cover member 100 mounted to the lower portion of the shift knob body 20. The shift knob structure 1 is mounted on top of the shift shaft 10 of a vehicle transmission. For this purpose, the cover member 100 is provided with an opening through which the shift shaft 10 is inserted, and the shift knob body 20 is provided with an insertion hole through which the shift shaft 10 is inserted.

The shift knob body 20 is provided with a grip 22 gripped by the driver by the hand for manipulation, and a lower end portion 24 formed below the grip 22. A button unit 26 is provided in the grip 22. The lower end portion 24 is formed with a support part 30 in which is inserted a securing member 80 for clamping or fixing the shift knob body 20 to the shift shaft 10, inserted through the insertion hole. The securing member 80 is formed of an elastically deformable material (e.g., a metal material). In this embodiment the securing member 80 is provided with a shape of a leaf spring. The support part 30 has a groove for restricting the vertical movement of the inserted securing member 80. The securing member 80 is pushed into the groove in the direction of arrow A and is secured in the support part 30. The support part 30 fixes a first end 80a of securing member 80 in its place but does not fix an opposite, second end 80b. Thus, by allowing the support part 30 to fix only the first end 80a of the securing member 80, the securing member 80 is deformable in the direction away from the groove of the support part 30 relative to the fixed first end 80a.

The lower end portion 24 is formed with locking pawls 40 and 42 for mounting the cover member 100. The locking pawls 40 and 42 extend downward from the bottom of the grip 22 and is configured to be elastic in the radial direction. The outer surface of the lower end portion 24 is also provided with a short projection 44 and a long projection 46 extending downward from the boundary between the lower end portion 24 and the grip 22. A groove is formed between the short projection 44 and a long projection 46. As described later, relative rotation of the shift knob body 20 and the cover member 100 is restricted as a result of a rotation stopper wall portion 120 of the cover member 100 being engaged with the groove between the short projection 44 and the long projection 46. The short projection 44 and the long projection 46 may be provided at positions in the lower end portion 24 shown in FIG. 1A rotated by 180° around the axis.

The shift shaft 10 is provided with a pair of notch grooves 14 extending downward from a shaft end 16. The notch grooves 14 are provided to accept a rotation stopper member (not shown) formed in the insertion hole of the shift knob body 20. The top end of each of the notch grooves 14 is formed with a guide portion 16b configured to facilitate the acceptance of the rotation stopper member, and the groove width is extended accordingly. The shaft end 16 is also formed with a tapered portion 16a toward the shaft lateral surface. The tapered portion 16a is configured to come into contact with the securing member 80 as the shift shaft 10 is inserted into the shift knob structure 1, thereby deforming the securing member 80 easily in the shaft radial direction.

The shift shaft 10 is provided, below the lower end of the notch grooves 14, with a locking groove 12 for locking the securing member 80 mounted to the shift knob body 20. FIG. 1B is a perspective view of the shift shaft 10. FIG. 1B is a perspective view obtained by rotating the shift shaft 10 shown in FIG. 1A around the axis by 180° and shows the locking groove 12 produced by cutting the shaft circumferential surface in the circumferential direction.

The shift knob structure 1 is assembled such that the securing member 80 is inserted into and mounted in the support part 30 of the shift knob body 20. The relative position of the cover member 100 with respect to the shift knob body 20 in the rotational direction is adjusted before mounting the cover member 100 to the lower end portion 24 of the shift knob body 20.

More specifically, the relative position of the cover member 100 with respect to the shift knob body 20 in the rotational direction is adjusted such that the rotation stopper wall portion 120 in the cover member 100 enters the groove between the short projection 44 and the long projection 46 of the shift knob body 20. By pushing the cover member 100 against the shift knob body 20 after adjusting the relative rotational positions, the short projection 44 and the long projection 46 are engaged with the rotation stopper wall portion 120, restricting relative rotation of the cover member 100 and the shift knob body 20.

Further, the locking pawls 40 and 42 are locked by locking parts formed in the interior surface of the cover member 100, restricting the vertical movement of the cover member 100 with respect to the shift knob body 20. In this way, the shift knob structure 1 that can be inserted into the shift shaft 10 is formed.

Subsequently, the shaft end 16 of the shift shaft 10 is inserted into the shift knob structure 1 such that the rotational position of the securing member 80 supported by the shift knob body 20 relative to that of the locking groove 12 of the shift shaft 10 are aligned. As the securing member 80 reaches the shaft end 16 of the shift shaft 10, the securing member 80 comes into contact with the tapered portion 16a and is bent outward in the direction of radius of the shaft by the tapered portion 16a. This causes the securing member 80 to be deformed without being stuck on the shaft end 16 and slides down the circumferential surface of the shift shaft 10, maintaining the state of being bent in the direction of radius of the shaft. As the shift knob structure 1 is further pushed into the shift shaft 10, the rotation stopper member of the shift knob body 20 reach the shaft end 16 of the shift shaft 10 and are guided by the guide portion 16b and inserted into the pair of notch grooves 14. This restricts relative rotation of the shift knob body 20 and the shift shaft 10.

As the shift knob structure 1 is further pushed until the securing member 80 reaches the locking groove 12, the securing member 80 returns to the original state from the deformed state and is set in the locking groove 12. By locking the securing member 80 in the locking groove 12, the movement of the shift knob body 20 in the direction of shaft axis is restricted, i.e., the vertical movement of the shift knob body 20 relative to the shift shaft 10 is restricted. Thus, the shift knob structure 1 according to the embodiment can be easily mounted on top of the shift shaft 10 formed with a single locking groove 12.

FIG. 1C shows a state in which the shift knob structure 1 is mounted on top of the shift shaft 10. According to the embodiment, it is easy to mount the shift knob structure 1 on the shift shaft 10 provided with a pair of notch grooves 14 and a single locking groove 12, by forming the shift knob structure 1 such that the securing member 80 is inserted to and mounted in the shift knob body 20 and the cover member 100 is mounted to the lower end portion 24. The structure according to the embodiment including the shift shaft 10, the shift knob body 20, the cover member 100, and the securing member 80 may be referred to as "shift knob mounting structure" or "shift lever structure".

Figure 2A:
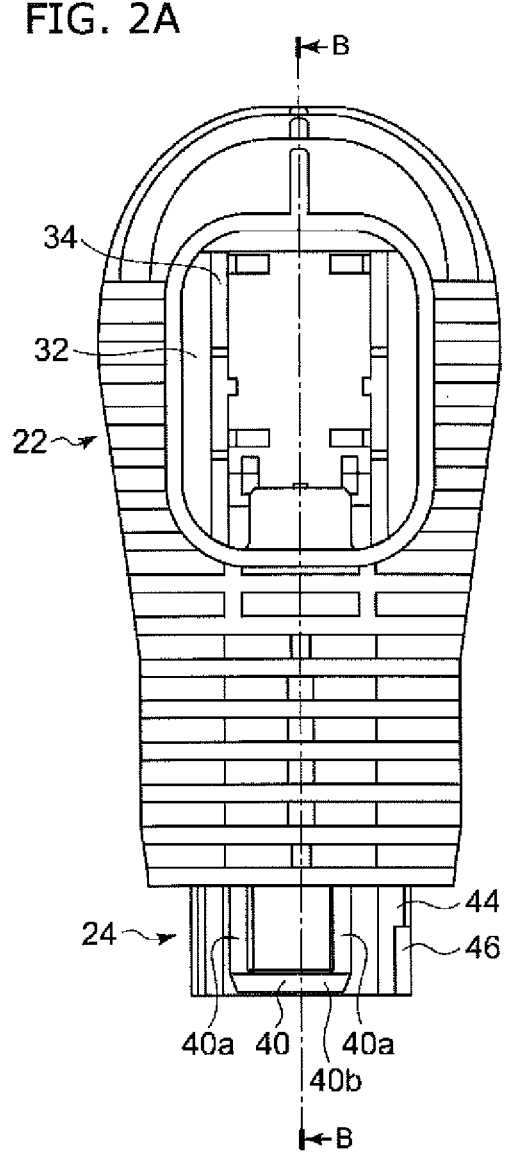
FIGS. 2A-2B show the structure of the shift knob body.
Figure 2B:
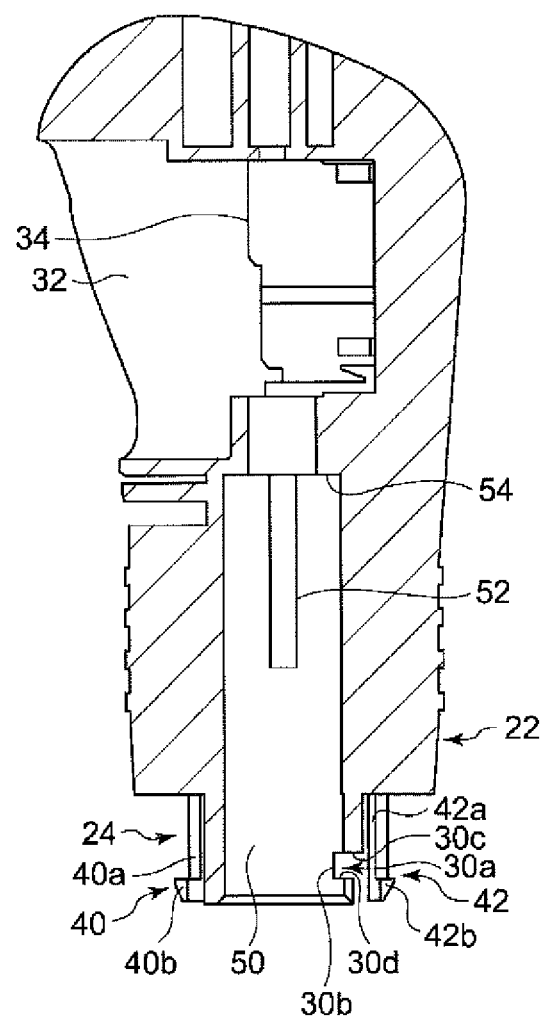

A description will now be given of the detailed structure of the shift knob body 20 and the cover member 100. FIG. 2A is a front view of the shift knob body 20, and FIG. 2B shows a cross section B-B of the shift knob body 20 shown in FIG. 2A. The front of the grip 22 is formed with a button opening 32 for mounting the button unit 26. The button unit 26 is mounted on a button mount part 34 through the button opening 32. A vehicle shift lever mechanism is formed with a locking mechanism for preventing the vehicle driving range from being switched to the R range by a misoperation while the vehicle is moving forward, or preventing the vehicle driving range from being switched to the D range or the R range by a misoperation while the vehicle is parked. The button unit 26 is provided to allow the driver to cancel the locking mechanism.

The front and rear of the lower end portion 24 are formed with locking pawls 40 and 42 that extend downward from the bottom of the grip 22. The locking pawls 40 and 42 are mounts for mounting the cover member 100 and are formed so as to be elastically deformable in the radial direction. The locking pawl 40 is provided with a pair of legs 40a extending downward from the bottom of the grip 22, and a pawl 40b joining the lower ends of the pair of legs 40a and projecting radially outward. Similarly, the locking pawl 42 is provided with a pair of legs 42a extending downward from the bottom of the grip 22, and a pawl 42b joining the lower ends of the pair of legs 42a and projecting radially outward. The pawl 40b of the locking pawl 40 and the pawl 42b of the locking pawl 42 are locked by locking parts formed in the interior surface of the cover member 100 described later.

An insertion hole 50 in which to insert the shift shaft 10 is formed inside the shift knob body 20. The insertion hole 50 may be a bottomed hole where a hole end 54 defines the bottom. At least, an annular bottom that functions as an insertion stopper needs to be provided at a position where the shaft end 16 of shift shaft 10 is inserted. A plate-shaped rotation stopper member 52 is provided to extend downward from the hole end 54 of the insertion hole 50. The rotation stopper member 52 is formed to so as to be engaged with the pair of notch grooves 14 of the shift shaft 10. It is therefore preferable that the thickness of the rotation stopper member 52 be equal to or slightly smaller than the width of the notch grooves 14 and the width of the rotation stopper member 52 be equal to or slightly larger than the distance between the pair of notch grooves 14.

The support part 30 for supporting the securing member 80 is formed on the rear of the lower end portion 24 and radially inward from the locking pawl 42. The support part 30 is provided with a groove 30a defined by a side wall 30b, an upper wall 30c, and a lower wall 30d. The vertical movement of the securing member 80 of a leaf spring shape placed in the groove 30a is restricted by the upper wall 30c and the lower wall 30d, and the radial inward movement thereof is restricted by the side wall 30b. As described above, the support part 30 supports the securing member 80 in a way that the first end 80a of the securing member 80 is fixed in its place and the second end 80b is a free end. Thus, the securing member 80 is deformable radially outward, with the first end 80a being an anchorage point.

Figure 3A:
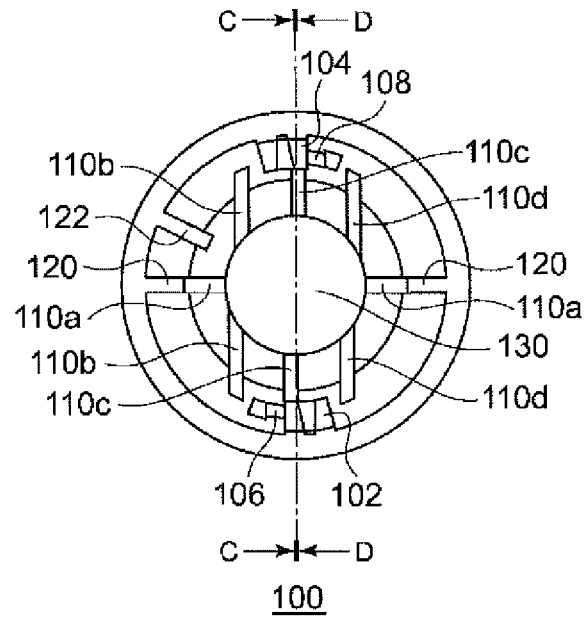
FIGS. 3A-3C show the structure of the cover member.
Figure 3B:
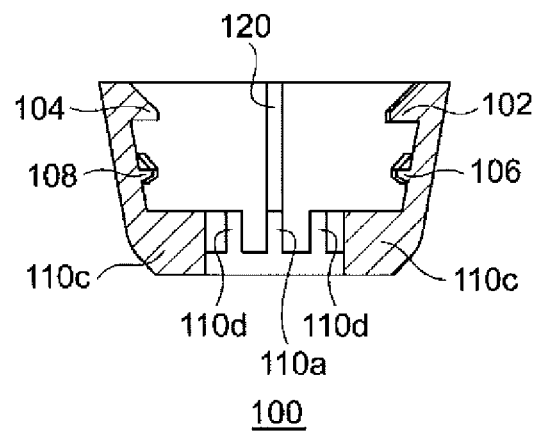
Figure 3C:
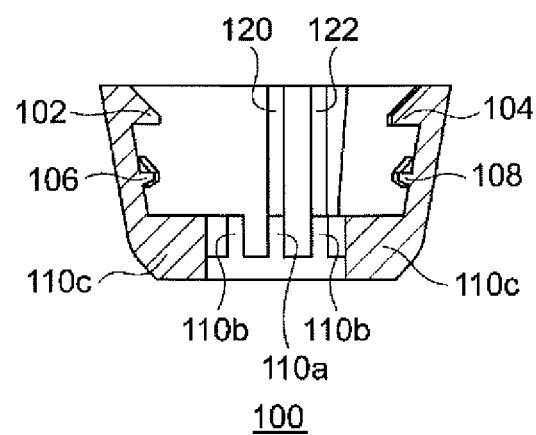

FIG. 3A shows the top surface of the cover member 100, FIG. 3B shows a cross section C-C of the cover member 100 shown in FIG. 3A, and FIG. 3C shows a cross section D-D of the cover member 100 shown in FIG. 3A.

The cover member 100 is provided with an opening 130 through which the shift shaft 10 is inserted. The opening 130 is formed to run through the cover bottom. A plurality of ribs 110a, 110b, 110c, and 110d (hereinafter, generically referred to as "ribs 110" except where distinction is indicated) are provided around the opening 130 in the cover bottom. The ribs 110 are provided to stand around the opening 130 so as to restrict the relative tilt of the cover member 100 and the shift shaft 10.

The cover member 100 is provided with a pair of rotation stopper wall portions 120 projecting radially inward on the cover interior surface. As described above, the shift knob body 20 and the cover member 100 are secured to each other such that the rotation stopper wall portion 120 enters the groove between the short projection 44 and the long projection 46 of the shift knob body 20 so as to restrict relative rotation of the cover member 100 and the shift knob body 20. When the rotation stopper wall portion 120 leaves the groove between the short projection 44 and the long projection 46, relative rotation of the cover member 100 and the shift knob body 20 is permitted.

The cover member 100 is also provided with a bending wall portion 122 that projects radially inward on the cover interior surface. As the cover member 100 and the shift knob body 20 are rotated relative to each other, the bending wall portion 122 comes into contact with the second end 80b of the securing member 80 and deforms the securing member 80 radially outward, unlocking the securing member 80 from the locking groove 12 of the shift shaft 10. The unlocking operation will be described later in further detail.

As shown in FIGS. 3B and 3C, the cover interior surface is formed with upper projections 102 and 104 and lower projections 106 and 108 that have the function of locking the locking pawls 40 and 42 of the shift knob body 20.

Each of the upper projections 102, 104 and the lower projections 106, 108 is a locking part capable being locked to the locking pawl 40 or 42 (mounts). The upper projections 102 and 104 are formed on the upper side of, and, more specifically, at the upper edge of the interior surface of the cover member 100 so as to project radially inward. The lower projections 106 and 108 are formed on the lower side of the interior surface of the cover member 100, and, more specifically, below the upper projections 102 and 104 so as to project radially inward. The lower projections 106 and 108 may be formed to have a width larger than the upper projections 102 and 104. Preferably, the upper projections 102 and 104 are formed with a tapered surface tapered radially inward and downward from the upper edge of the cover member 100 so as to make it easy to accept the locking pawls 40 and 42 and difficult to extract the locking pawls 40 and 42.

The upper projections 102, 104 and the lower projections 106, 108 both jut radially inward and function as locking parts capable of being locked with the locking pawls 40 and 42. The upper projections 102 and 104 are formed to jut more radially inward than the lower projections 106 and 108. In other words, the distance between the central axis of the cover member 100 and the jutting end of the upper projections 102 and 104 is configured to be smaller than the distance between the central axis and the jutting end of the lower projections 106 and 108.

A description will now be given of the operation of removing the shift knob structure 1 from the shift shaft 10 by unlocking the securing member 80 from the locking groove 12.

Figure 4A:
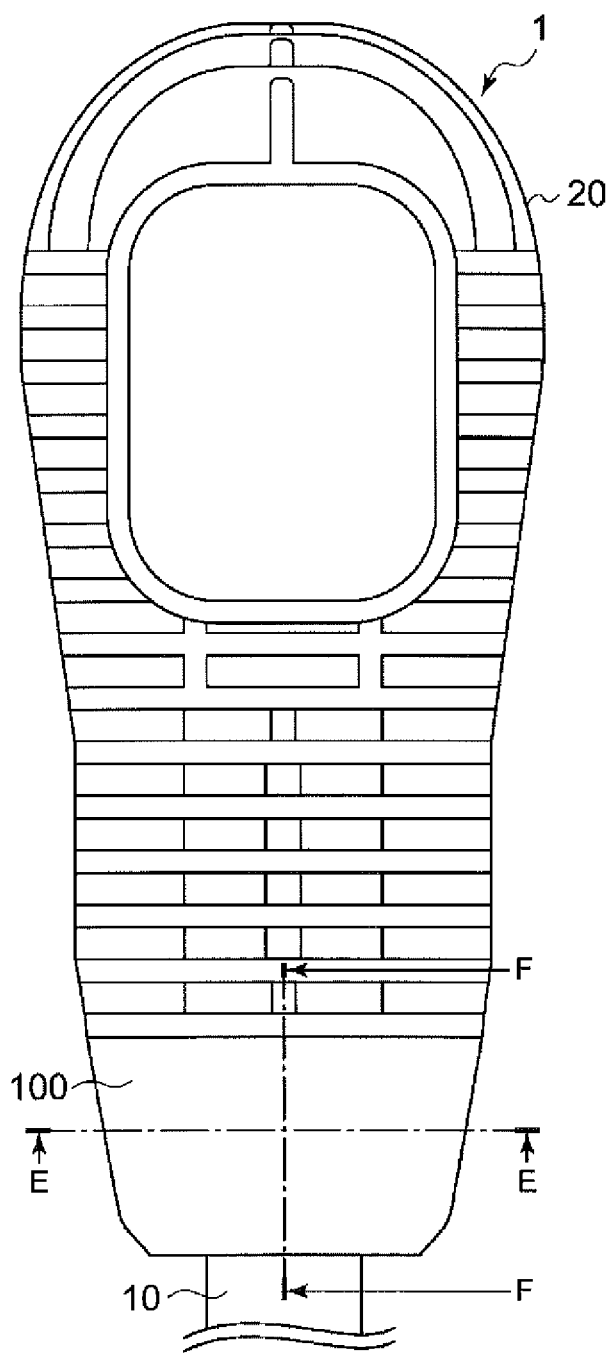
FIGS. 4A-4C show the appearance and internal structure of the first state in which the shift knob body and the cover member are mounted to each other.
Figure 4B:
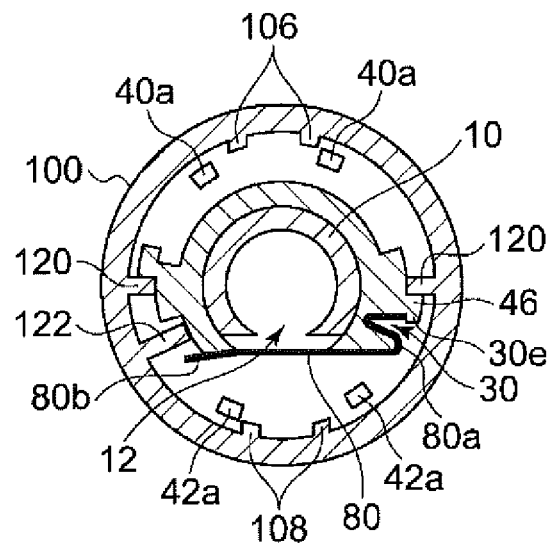
Figure 4C:
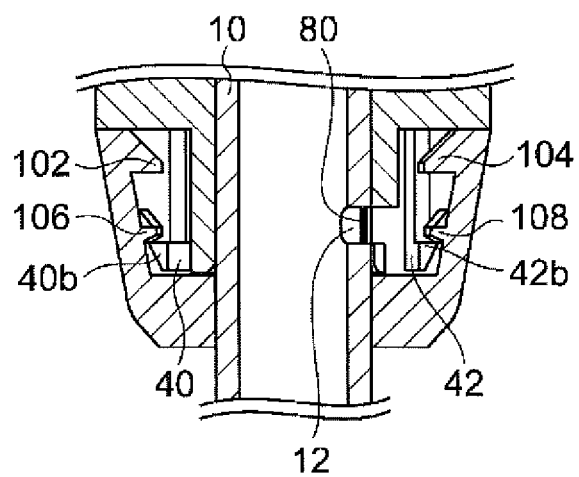

FIG. 4A shows a state in which the shift knob structure 1 and the shift shaft 10 are secured to each other. FIG. 4B shows a cross section E-E of the shift knob structure 1 shown in FIG. 4A, and FIG. 4C shows a cross section F-F of the shift knob structure 1 shown in FIG. 4A. The line E-E cuts across the cover member 100 at a height of the securing member 80.

A description will be given of the structure for supporting the securing member 80 by the support part 30 with reference to FIG. 4B. The first end 80a of the securing member 80 is formed with two bent portions. The support part 30 is provided with a retainer 30e that comes into contact with and accommodates the first end 80a thus bent, and restricts the movement of the securing member 80 in the direction of insertion (including the direction of extraction). As shown, the second end 80b of the securing member 80 is not fixed. Therefore, the securing member 80 is supported by the support part 30 so as to be deformable radially outward. In this state, the securing member 80 is set in the locking groove 12 of the shift shaft 10 and is locked therein. The vertical movement of the securing member 80 is restricted by the upper and lower edges of the locking groove 12 (see FIG. 4C).

Referring to FIG. 4C, the pawl 40b of the locking pawl 40 is locked by the lower projection 106 and the pawl 42b of the locking pawl 42 is locked by the lower projection 108. As a result of locking these components, the cover member 100 is mounted to the shift knob body 20. When the cover member 100 is pushed against the lower end portion 24 of the shift knob body 20 to mount the cover member 100 on the shift knob body 20, the pawls 40b and 42b of the pair of locking pawls 40 and 42 come into contact with the tapered surface of the pair of upper projections 102 and 104. In this process, the legs 40a and 42a are deformed radially inward, allowing the pawls 40b and 42b to move past the upper projections 102 and 104, respectively. When the pawls 40b and 42b subsequently come into contact with the pair of lower projections 106 and 108, respectively, the legs 40a and 42a are deformed radially inward again, and the pawls 40b and 42b move past the lower projections 106 and 108, respectively, and are locked by the locking surfaces (rear surface) of the lower projections 106 and 108, respectively. In this way, relative vertical movement of the shift knob body 20 and the cover member 100 is restricted.

Figure 7A:
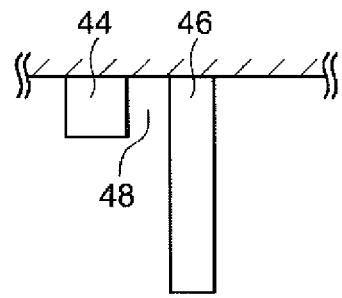
FIGS. 7A-7C show the relative positions of the rotation stopper wall portion formed in the cover member and the groove formed in the lower end portion of the shift knob body.
Figure 7B:
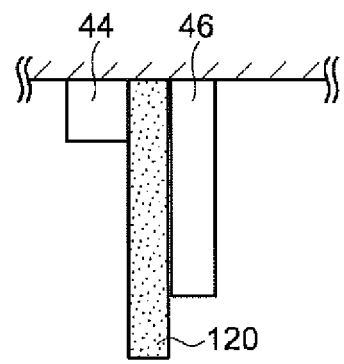
Figure 7C:
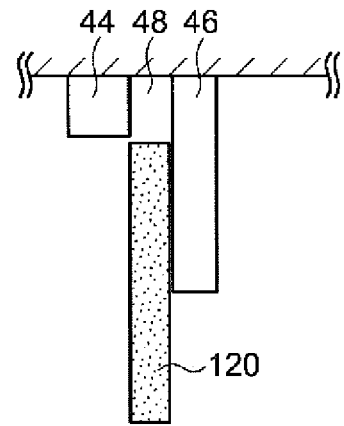

As described already, relative movement of the shift knob body 20 and the cover member 100 in the rotational direction is restricted by the rotation stopper wall portions 120. FIGS. 7A-7C show the relative positions of the rotation stopper wall portion 120 formed in the cover member 100 and the groove formed in the lower end portion 24 of the shift knob body 20. FIG. 7A shows the relative positions of the short projection 44 and the long projection 46 formed in the lower end portion 24. The short projection 44 and the long projection 46 are formed to project from the cylindrical surface of the lower end portion 24 in the radial direction. A groove 48 is formed between the short projection 44 and the long projection 46. The length of the short projection 44 is defined to be smaller than the vertical distance between the locking surface of the upper projection 102 and the locking surface of the lower projection 106 in the cover member 100. The length of the long projection 46 is defined to be larger than the vertical distance between the locking surface of the upper projection 102 and the locking surface of the lower projection 106.

FIG. 7B shows the relative positions of the short projection 44, the long projection 46, and the rotation stopper wall portion 120 of the cover member 100 occurring when the locking pawls 40 and 42 are locked by the lower projections 106 and 108, respectively. In this state, the rotation stopper wall portion 120 enters the groove 48. As a result, the rotation stopper wall portion 120 is engaged by the short projection 44 and the long projection 46 in the rotational direction, restricting rotational movement of the shift knob body 20 and the cover member 100.

Figure 5A:
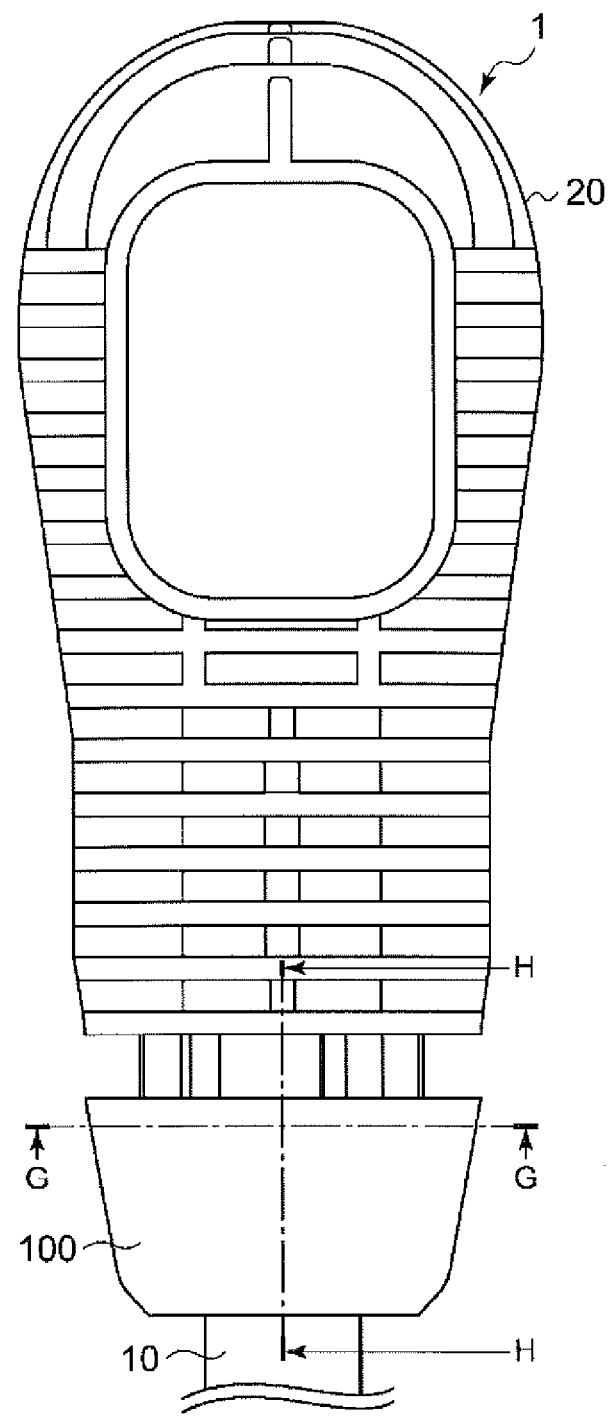
FIGS. 5A-5C show the appearance and internal structure of the second state in which the shift knob body and the cover member are mounted to each other.
Figure 5B:
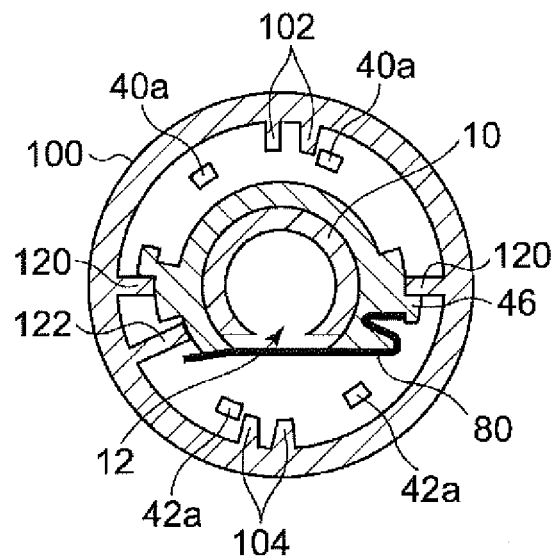
Figure 5C:
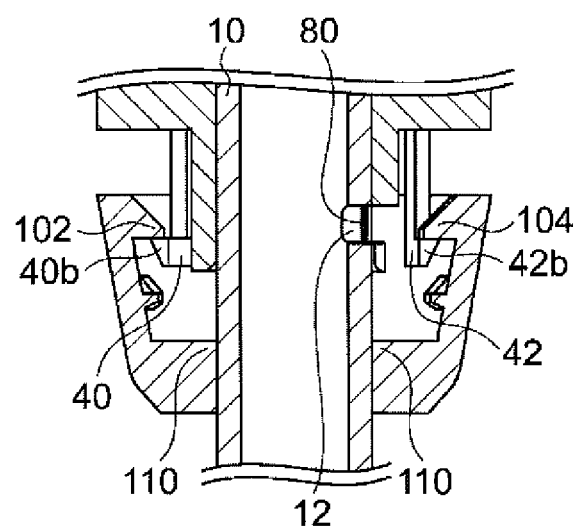

FIG. 5A shows a state in which the cover member 100 is lowered along the shift shaft 10. FIG. 5B shows a cross section G-G of the shift knob structure 1 shown in FIG. 5A, and FIG. 5C shows a cross section H-H of the shift knob structure 1 shown in FIG. 5A. The line G-G cuts across the cover member 100 at a height of the securing member 80. When the operator applies a load in a direction that moves the cover member 100 downward and away from the shift knob body 20 to unlock the locking pawls 40 and 42 from the lower projections 106 and 108, respectively, the cover member 100 is moved downward.

Referring to FIG. 5C, the pawl 40b of the locking pawl 40 is locked by the upper projection 102, and the pawl 42b of the locking pawl 42 is locked by the upper projection 104. As a result of locking these components, the cover member 100 maintains a state of being mounted on the shift knob body 20 even if the cover member 100 is moved downward from the state shown in FIG. 4C. As already described, the jutting end of the upper projections 102 and 104 jut more radially inward than the jutting end of the lower projections 106 and 108. Therefore, a larger load is necessary to unlock the locking pawls 40 and 42 from the upper projections 102 and 104 than to unlock the locking pawls 40 and 42 from the lower projections 106 and 108. Therefore, even when the cover member 100 is moved downward by applying a downward load on the cover member 100 to unlock the locking pawls 40 and 42 from the lower projections 106 and 108, the locking pawls 40 and 42 are trapped by the upper projections 102 and 104, respectively, and are locked thereby.

Thus, the cover member 100 and the shift knob body 20 can be placed in a state where relative rotation is disabled or a state where relative rotation is enabled, by ensuring that the locking pawls 40 and 42 can be locked to locking parts provided in two stages, i.e., the lower projections 106, 108 and the upper projections 102 and 104.

Even when the cover member 100 is moved downward, the locking state of the locking groove 12 of the shift shaft 10 and the securing member 80 is maintained. The shift shaft 10 and the shift knob body 20 are not unlocked from each other.

FIG. 7C shows the relative positions of the the short projection 44, the long projection 46, and the rotation stopper wall portion 120 of the cover member 100 occurring when the locking pawls 40 and 42 are locked by the upper projections 102 and 104, respectively. The rotation stopper wall portion 120 leaves the groove 48 as a result of the cover member 100 being moved downward. This is because the length of the short projection 44 is defined to be smaller than the distance of travel of the cover member 100, i.e., the distance between the locking surfaces of the upper projections 102, 104 and those of the lower projections 106, 108. As a result of the rotation stopper wall portion 120 leaving the groove 48, the restriction of movement of the cover member 100 and the shift knob body 20 in the rotational direction is removed. Since the length of the long projection 46 is defined to be larger than the distance of travel of the cover member 100, the rotation stopper wall portion 120 cannot be moved in the direction of the long projection 46. Thus, the cover member 100 can be rotated in the direction that the rotation stopper wall portion 120 moves away from the long projection 46.

Figure 6A:
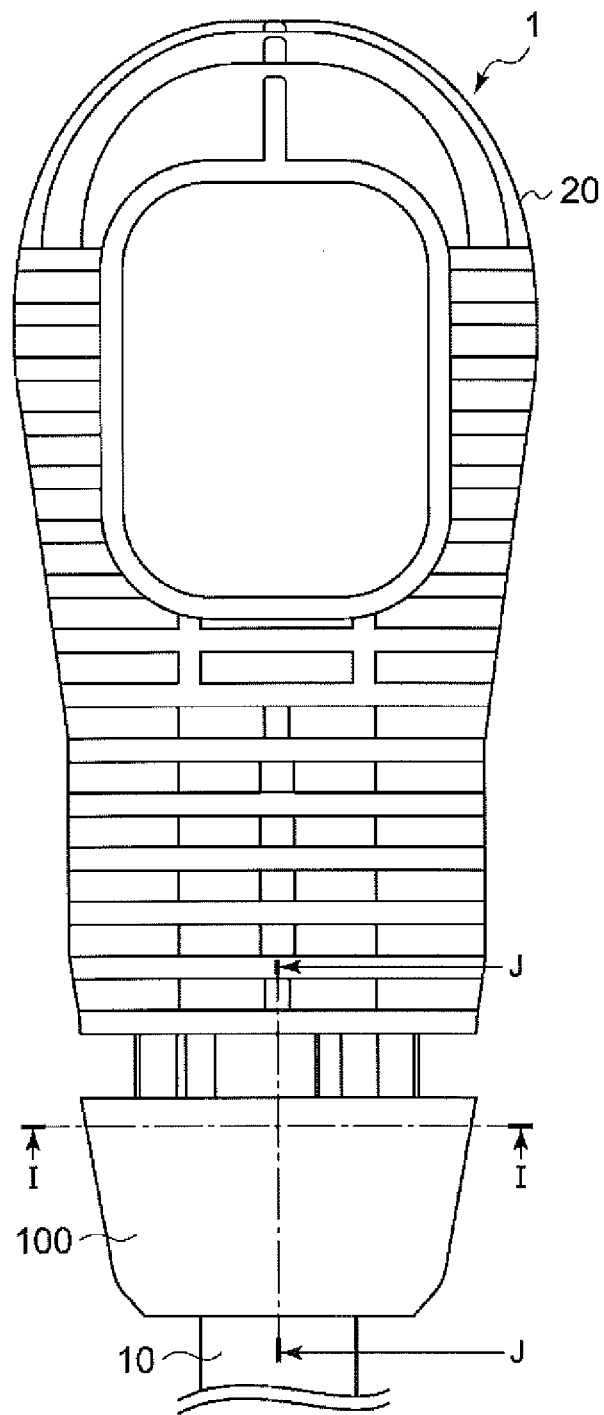
FIGS. 6A-6C show the appearance and internal structure of the second state in which the shift knob body and the cover member are mounted to each other.
Figure 6B:
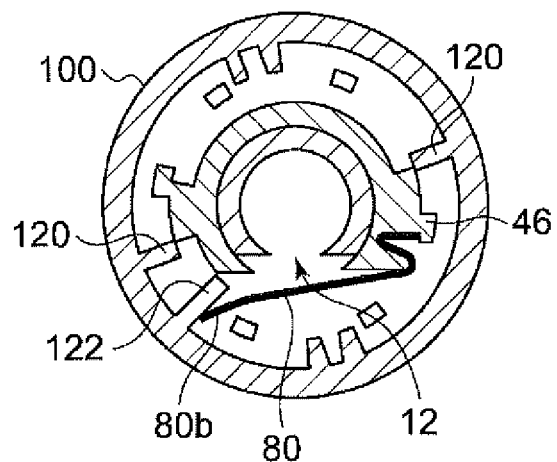
Figure 6C:
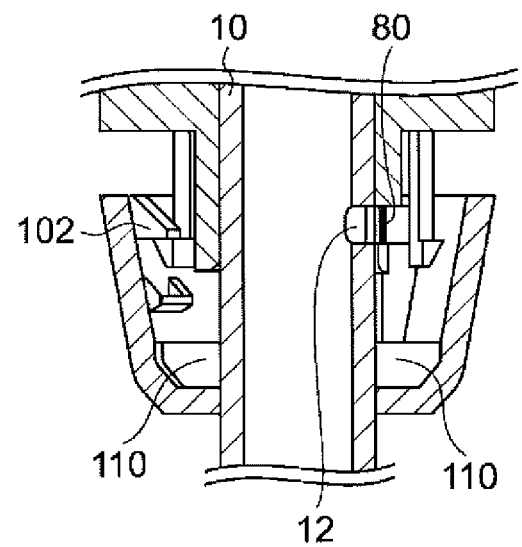

FIG. 6A shows a state in which the cover member 100 is lowered and then rotated. FIG. 6B shows a cross section I-I of the shift knob structure 1 shown in FIG. 6A, and FIG. 6C is a cross section J-J of the shift knob structure 1 shown in FIG. 6A. The line I-I cuts across the cover member 100 at a height of the securing member 80. The operator pinches the cover member 100 with fingers and rotates the cover member 100 in a direction that the rotation stopper wall portion 120 and the long projection 46 move away from each other. The bottom of the cover member 100 is provided with a rib 110 so as to surround the shift shaft 10. Therefore, the operator can rotate the cover member 100 in a stable manner without tilting the cover member 100 with respect to the shift shaft 10.

Referring to FIG. 6B and 6C, the second end 80b of the securing member 80 comes into contact with the bending wall portion 122 by rotating the cover member 100. In association with the rotation of the cover member 100, the securing member 80 is deformed in the direction of the shaft radius, i.e., in the direction away from the locking groove 12. As a result of the deformation, the securing member 80 is removed from the locking groove 12, unlocking the securing member 80 and the locking groove 12. When the the securing member 80 and the locking groove 12 are unlocked, restriction of the vertical movement of the shift knob body 20 and the shift shaft 10 is removed so that the operator can extract the shift knob body 20 from the shift shaft 10.

By locking the securing member 80 to the single locking groove 12 formed in the shift shaft 10 to secure the shift knob structure 1 according to the embodiment to the shift shaft 10, the shift knob structure I can be removed from the shift shaft 10 merely by rotating the cover member 100 with respect to the shift knob body 20 and unlocking the securing member 80 from the locking groove 12 accordingly. Since there is no need to pull the securing member 80 out of the shift knob body 20, there is no likelihood that the securing member 80 is lost. The job of dismantling shift knob structure 1 can be performed with the securing member 80 remaining mounted to the shift knob body 20.

Since the locking parts for locking the shift knob body 20 and the cover member 100 are formed in two vertically displaced stages, the cover member 100 can remain mounted on the shift knob body 20 even when the shift knob body 20 and the cover member 100 are rotated relative to each other. This allows the cover member 100 to be removed along with the shift knob body 20 when the shift knob body 20 is removed from the shift shaft 10. Advantageously, it is not necessary to manage the cover member 100 and the shift knob body 20 separately for maintenance.

Since it is not necessary to remove the securing member 80 from the shift knob body 20, it is not necessary to secure a distance of lowering (holding down) the cover member 100 sufficient to accommodate the fingers of the operator. In other words, the distance of holding down the cover member 100 needs only to be small and a larger area of the shift shaft 10 can be designed than in the related art.

Given above is an explanation based on exemplary embodiments. The embodiment is intended to be illustrative only and it will be obvious to those skilled in the art that various modifications to constituting elements and processes could be developed and that such modifications are also within the scope of the present invention. In the embodiment described above, the parting line that parts the shift knob body 20 from the cover member 100 is perpendicular to the axial direction. In one variation, the shift knob body 20 and the cover member 100 may be shaped such that the parting line looks diagonal in a side view of the shift knob structure 1. In the embodiment described above, a pin member of a flat leaf spring shape having the first end 80a and the second end 80b is employed as the securing member 80. Alternatively, an elastically deformable member of other shapes may be employed.

Figure 8A:
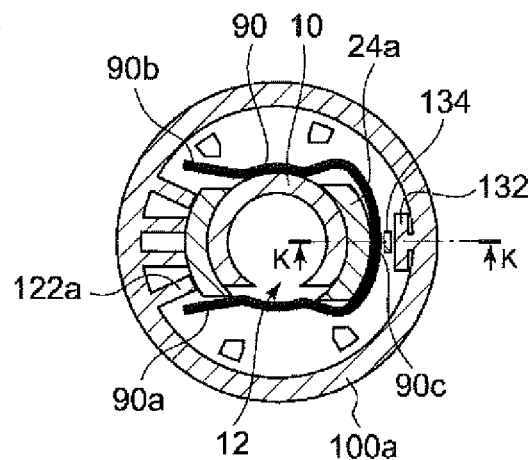
FIGS. 8A-8C show a variation of the shift knob structure.
Figure 8B:
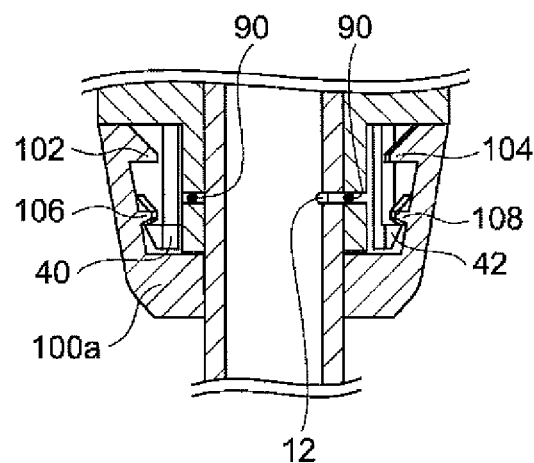

FIG. 8 shows the shift knob structure 1 in which a substantially Ω-shaped pin member is employed as a securing member 90. Like the securing member 80, the securing member 90 is also formed of an elastically deformable material. FIG. 8A shows a cross section E-E of the shift knob structure 1 shown in FIG. 4A, and FIG. 8B shows a cross section F-F of the shift knob structure 1 shown in FIG. 4A. The line E-E cuts across the cover member 100 at a height of the securing member 90. The main difference from the cross section E-E shown in FIG. 4A will be described with reference to FIG. 8A.

Figure 8C:
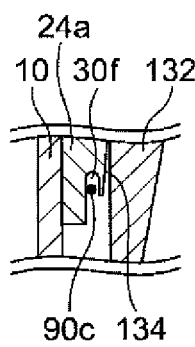

The securing member 90 is formed as a substantially Ω-shaped pin member and is provided with a first end 90a and a second end 90b. A retainer 134 in a lower end portion 24a defines a support part having a groove in which the securing member 90 can be inserted and accommodated. The securing member 90 is inserted into this groove. FIG. 8C shows a cross section K-K of the shift knob structure 1 shown in FIG. 8A. A groove 30f is formed in the lower end portion 24a. A central part 90c of the securing member 90 is inserted in the groove 30f, and the retainer 134 prevents the securing member 90 from being dislodged from the groove 30f. This prevents dislodging of the securing member 90 while a cover member 100a is mounted on the lower end portion 24a. The outer surface of the retainer 134 comes into contact with a rotation stopper 132 formed on the interior surface of the cover member 100a and is configured to restrict relative rotation of the lower end portion 24a and the cover member 100a.

The shift shaft 10 is formed with a single locking groove 12, as described in the embodiment. The pin member defined by the part of the securing member 90 between the first end 90a and the central part 90c is set and locked in the locking groove 12, restricting vertical movement of the shift knob structure 1 with respect to the shift shaft 10. The pin member defined by the part between the second end 9b and the central part 90c comes into contact with the outer circumference of the shift shaft 10. As described above, the securing member 90 provides the same advantage as the securing member 80. The securing member 90 is locked by the single locking groove 12 of the shift shaft 10. By rotating the cover member 100a relative to the shift knob body 20, the pin member between the first end 90a and the central part 90c is deformed in the direction of shaft radius, unlocking the securing member 90 from the locking groove 12.

More specifically, as the operator pinches the cover member 100a with fingers and rotates the cover member 100a relative to the shift knob body 20 while the locking pawls 40 and 42 are unlocked from the lower projections 106 and 108, respectively, and locking the locking pawls 40 and 42 to the upper projections 102 and 104, respectively, the first end 90a of the securing member 90 comes into contact with a bending wall portion 122a with the result that the pin member between the first end 90a and the central part 90c is deformed in association with the rotation of the cover member 100a, as described with reference to FIGS. 5A-5C and 6A-6C. The deformation removes the securing member 90 from the locking groove 12, unlocking the securing member 90 and the locking groove 12 from each other. When the the securing member 90 and the locking groove 12 are unlocked, the restriction of the vertical movement of the shift knob body 20 and the shift shaft 10 is removed so that the operator can extract the shift knob body 20 from the shift shaft 10.

The securing members 80 and 90 may be of any shape so long as they elastically deformable and can be locked in the locking groove 12 of the shift shaft 10.

Figure 9A:
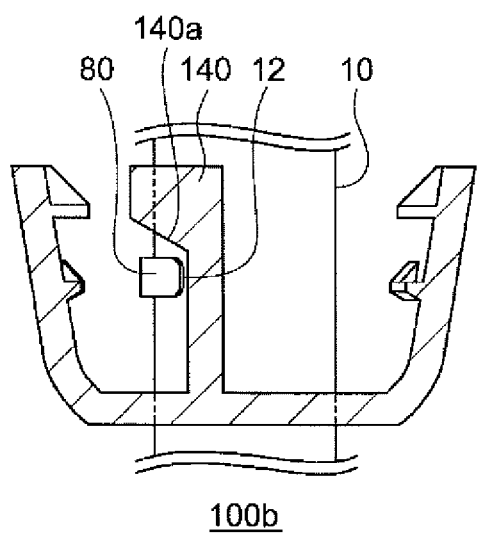
FIGS. 9A-9B show a variation of the structure of the cover member.
Figure 9B:
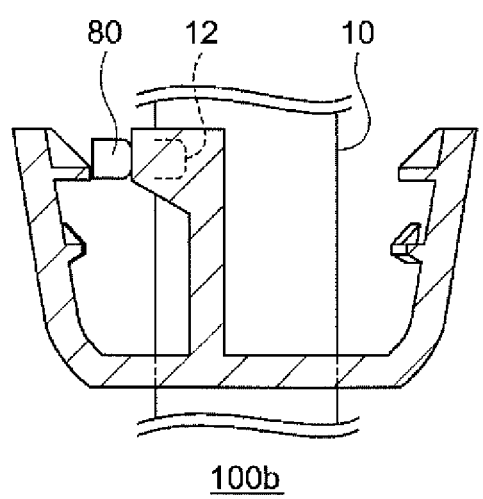

FIG. 9 shows a variation of the cover member. A cover member 100b according to this variation has the function of automatically unlocking the securing member 80 from the locking groove 12 when the cover member 100b is moved downward relative to the shift knob body 20. FIG. 9A shows a displacer 140 provided to stand from the cover bottom. The displacer 140 is placed between the edge of the opening 130 and the second end 80b of the securing member 80 and is provided with a tapered portion 140a for displacing the securing member 80 radially outward. The cover member 100b is provided with the displacer 140 in place of the bending wall portion 122 described in the embodiment. FIG. 9B shows a state in which the securing member 80 is moved radially outward by the tapered portion 140a and leaves the locking groove 12, when the cover member 100b is moved downward. By providing the displacer 140, the securing member 80 is unlocked from the locking groove 12 merely by moving the cover member 100b downward.

What is claimed is:

1. A shift knob structure comprising:
   a shift knob body; and
   a cover member mounted to the bottom of the shift knob body
   wherein the shift knob body includes:
     an insertion hole in which a shaft is inserted,
     a support part that supports a securing member for fixing the shift knob body to the shaft inserted in the insertion hole, and
     a mount part for mounting the cover member;
   wherein the cover member includes:
     an opening through which the shaft is inserted, and
     a locking part which is locked to the mount part;
   wherein:
   the support part supports the securing member so as to be deformable in a direction of shaft radius,
   movement of the shift knob body in a direction of shaft axis is restricted by the securing member being locked by a locking groove in the shaft,
   the securing member is unlocked from the locking groove in the shaft by rotating the cover member relative to the shaft knob body so as to deform the securing member in the direction of shaft radius,
   the locking part includes first and second locking parts capable of being locked to the mount part,
   in a first state in which the first locking part is locked to the mount part, relative rotation of the cover member and the shift knob body is restricted,
   in a second state in which the second locking part is locked to the mount part, relative rotation of the cover member and the shift knob body is enabled,
   the cover member includes a rotation stopper wall portion, and the shift knob body includes a groove;
   in the first state, relative rotation of the cover member and the shift knob body is restricted by the rotation stopper wall portion entering the groove, and
   in the second state, relative rotation of the cover member and the shift knob body is enabled by the rotation stopper wall portion leaving the groove.

2. The shift knob structure according to claim 1, wherein the first locking part is a lower projection formed on an interior surface of the cover member and at a lower side of the cover member,
   the second locking part is an upper projection formed on the interior surface of the cover member and at an upper side of the cover member, and
   an end of the upper projection juts more radially inward than an end of the lower projection.

3. The shift knob structure according to claim 1, wherein the securing member is locked by a single locking groove.

4. The shift knob structure according to claim 1, wherein the cover member further includes a bending wall portion that comes into contact with an end of the securing member and deforms the securing member, when the cover member and the shift knob body are rotated relative to each other.

* * * * *